US 12,506,188 B2

(12) United States Patent
Klee

(10) Patent No.: US 12,506,188 B2
(45) Date of Patent: Dec. 23, 2025

(54) BATTERY HAVING A TEMPERATURE MEASUREMENT DEVICE

(71) Applicant: Viessmann Climate Solutions SE, Allendorf (DE)

(72) Inventor: Hanspeter Klee, Wetter (DE)

(73) Assignee: Viessmann Climate Solutions SE, Allendorf (DE)

( * ) Notice: Subject to any disclaimer, the term of this patent is extended or adjusted under 35 U.S.C. 154(b) by 776 days.

(21) Appl. No.: 17/775,289

(22) PCT Filed: Dec. 7, 2020

(86) PCT No.: PCT/EP2020/084793
§ 371 (c)(1),
(2) Date: May 7, 2022

(87) PCT Pub. No.: WO2021/115979
PCT Pub. Date: Jun. 17, 2021

(65) Prior Publication Data
US 2022/0399586 A1    Dec. 15, 2022

(30) Foreign Application Priority Data

Dec. 13, 2019    (DE) .................... 10 2019 219 602.0

(51) Int. Cl.
*H01M 10/48*    (2006.01)
*H01M 50/502*    (2021.01)
(52) U.S. Cl.
CPC ....... *H01M 10/486* (2013.01); *H01M 10/482* (2013.01); *H01M 50/502* (2021.01); *H01M 2200/10* (2013.01)
(58) Field of Classification Search
CPC ............. H01M 10/486; H01M 50/502; H01M 10/482; H01M 2200/10
See application file for complete search history.

(56) References Cited

U.S. PATENT DOCUMENTS 6,893,753 B2    5/2005  Iwaizono et al.
2003/0223474 A1*  12/2003  Roepke .................... G01K 1/16
                                                                    374/208

(Continued)

FOREIGN PATENT DOCUMENTS

CN          100472877 C      3/2009
DE    10 2013 088 865 A1    3/2014
(Continued)

OTHER PUBLICATIONS

International Search Report dated Mar. 19, 2021 for PCT App. Ser. No. PCT/EP2020/084793.
(Continued)

*Primary Examiner* — Matthew T Martin
*Assistant Examiner* — Taylor Harrison Krone
(74) *Attorney, Agent, or Firm* — Henricks Slavin LLP

(57)    ABSTRACT

An electric battery (20) comprises a multiplicity of individual cells (21). The battery (20) has at least one temperature measurement device (10). The temperature measurement device (10) comprises a multilayer circuit board (1) as carrier element, having an upper conductive layer (1a) and a lower conductive layer (1b), a multiplicity of temperature sensors (2) that are each configured to generate a temperature-dependent measured signal, and a multipole terminal (11) for reading the measured signals. Each of the multiplicity of temperature sensors (2) is in each case arranged on a first insulated region (5a) of the upper conductive layer (1a). The lower conductive layer (1b) has, for each temperature sensor (2), a second insulated region (5b) as thermal contact surface. Each first insulated region (5a) is thermally conductively connected to a corresponding second insulated region (5b), in each case via at least one through-connection (4). The second insulated regions (5b) are each in thermally (Continued)

conductive contact with at least one cell connector (22) of the battery (20).

10 Claims, 4 Drawing Sheets

(56) References Cited

U.S. PATENT DOCUMENTS

| | | | | |
|---|---|---|---|---|
| 2010/0203368 | A1* | 8/2010 | Matthias | H01M 10/486 |
| | | | | 429/90 |
| 2011/0210703 | A1* | 9/2011 | Souza | H01M 50/581 |
| | | | | 320/136 |
| 2011/0313696 | A1* | 12/2011 | Wolf | H01M 10/48 |
| | | | | 702/63 |
| 2013/0320918 | A1* | 12/2013 | Ohmer | H01M 10/4207 |
| | | | | 429/61 |
| 2017/0207431 | A1* | 7/2017 | Lienkamp | H01R 43/26 |

FOREIGN PATENT DOCUMENTS

| | | | |
|---|---|---|---|
| DE | 10 2016 207334 A1 | 11/2017 | |
| DE | 10 2017 212 742 A1 | 2/2018 | |
| EP | 1450422 A1 | 8/2004 | |
| EP | 2736100 B1 | 6/2017 | |
| JP | 2002124305 A * | 4/2002 | ............ Y02E 60/10 |
| KR | 1020180043875 A | 5/2018 | |
| WO | WO 2015019511 A1 | 2/2015 | |
| WO | WO 2016/153268 A1 | 9/2016 | |
| WO | WO 2016153267 A1 | 9/2016 | |

OTHER PUBLICATIONS

Office Action dated Jun. 5, 2020 for German App. Ser. No. 10 2019 219 602.0.

* cited by examiner

BATTERY HAVING A TEMPERATURE MEASUREMENT DEVICE

The present invention relates to a battery having a temperature measurement device for measuring the temperature of the battery at a plurality of measuring positions.

The laid-open patent application DE 10 2016 207 334 A1 discloses a measurement device for determining a temperature comprising a multi-layer circuit board and a sensor device arranged thereon. The conductive layers are arranged in a nested manner with partial areal overlap.

A temperature measurement device for a battery system is known from European patent EP 2 736 100 B1. A plurality of infrared temperature sensors for measuring the temperature of battery cells are arranged on a circuit board. The sensors are mechanically decoupled from the battery cells.

The international patent application WO 2016/153 267 A1 describes a battery pack comprising at least one battery cell, a heat sink for dissipating heat generated by the battery cell, a circuit board having a portion that contacts the heat sink, and a temperature sensor mounted on the circuit board to measure the heat conducted from the heat sink to the circuit board.

Another device for measuring a temperature of a battery pack is described in the Korean patent application KR 10 2018 0 043 875 A. Furthermore, WO 2015/019 511 A1 discloses a battery comprising a plurality of battery cells and a circuit board including a temperature sensor for measuring a temperature of the battery.

A battery of the generic type is used in particular as an energy store for supplying power to a building. Such a battery comprises a large number of individual cells which can be connected in series or in parallel. It is important to monitor the temperature of the cells, particularly in the case of batteries with a large number of individual cells. An object to be achieved by the invention is to provide a battery with a temperature measurement device which can monitor the temperature of all of the cells of the battery, if possible.

According to an aspect of the invention, the object is achieved by an electric battery according to claim 1. An electric battery according to the invention comprises at least one temperature measurement device. Further aspects of the invention are the subject matter of the dependent claims, the drawings and the following description of exemplary embodiments.

A temperature measurement device of the battery according to the invention comprises a multi-layer circuit board as a carrier element having an upper conductive layer and a lower conductive layer. In particular, the circuit board is made of a heat-insulating material so that it has a low thermal capacity. The temperature measurement device itself therefore only absorbs a small amount of heat from the battery to be measured. Thereby, the accuracy and reaction speed of the temperature measurement can be improved.

The temperature measurement device comprises a plurality of temperature sensors which are each configured to generate a temperature-dependent measurement signal. By providing a plurality of sensors, the temperature of a battery having a plurality of individual cells can be monitored at a plurality of measurement points. Thus, particularly reliable temperature monitoring can be ensured. The temperature sensors are, in particular, temperature-dependent resistors, for example negative temperature coefficient thermistor (NTC thermistors). At higher temperatures, such resistors conduct electric current better than at lower temperatures. NTC thermistors may be particularly inexpensive, have high measuring accuracy and be very reliable. However, the use is not limited to NTC thermistors. PTC thermistors or other chip solutions may also be used as measurement devices.

The plurality of temperature sensors are preferably arranged on the circuit board at regular intervals along a longitudinal direction of the circuit board. The positions of the sensors may be specified in particular by the arrangement of the individual cells in the battery to be measured. By arranging the sensors uniformly on the circuit board, it is possible, in particular, to measure and monitor a uniform temperature distribution of the individual cells.

The circuit board of the temperature measurement device includes a plurality of fastening means for fastening the circuit board to a battery. In particular, the fastening means are each arranged at the level of the sensors so that direct contact with the spot of the battery to be measured can be made.

The temperature measurement device includes a multipole terminal for reading the measurement signals. The multipole terminal includes, in particular, a plurality of signal poles each electrically connected to one of the plurality of temperature sensors via separate conductor tracks in the upper conductive layer. Furthermore, the multipole terminal preferably includes at least one ground pole (GND) electrically connected to each of the plurality of temperature sensors via at least one conductor track. The conductor tracks in the upper conductive layer may therefore be provided such that a first contact of each temperature sensor is connected to a grounding conductor track and a second contact of each temperature sensor is connected to a separate signal conductor track so that a separate temperature measurement value or resistance value can be read for each temperature sensor.

Each of the plurality of temperature sensors is respectively disposed on a first insulated region of the upper conductive layer. This first insulated region serves in particular as a thermal contact surface with the respective temperature sensor. The first insulated region is electrically insulated from the conductor tracks.

The lower conductive layer includes a second insulated region for each temperature sensor as a thermal contact surface with the object to be measured. The thermal contact surfaces in the lower conductive layer are arranged in such a way that they can be positioned directly on the surface of a battery to be measured and can be in thermal contact with the surface there.

Each first insulated region is thermally conductively connected to a corresponding second insulated region via at least one through-connection. The through-connections through the insulating circuit board create a thermally conductive connection between the thermal contact surface, which is brought into direct contact with the battery, and the respective temperature sensor. In particular, each first insulated region is thermally conductively connected to a corresponding second insulated region via a plurality of through-connections, for example via three or more through-connections. Thus, the thermal conduction between the temperature sensors and the respective thermal contact surface can be improved so that an accurate measurement of the temperature on the lower side of the circuit board is made possible.

The temperature sensors are preferably each surrounded by a thermally conductive jacket that is thermally conductively connected to the respective first insulated region. The thermally conductive jacket can improve the heat transfer from the first insulated region to the temperature sensor. In particular, the heat is uniformly distributed over the entire circumference of the temperature sensor so that a more accurate temperature measurement can be made possible.

A preferred circuit board has a large number of cutouts. The cutouts reduce the overall surface and the overall mass of the temperature measurement device. As a result, a total thermal capacity of the temperature measurement device can be reduced, which may result in improved measurement accuracy since the temperature measurement device can absorb less heat from the battery to be measured. Furthermore, the cutouts may allow the individual cells to be cooled by air since the individual cells are not covered. Preferably, the cutouts also serve to secure the temperature measurement device on the battery. More preferably, the cutouts are arranged in such a way that cell holders of the individual cells can protrude through the cutouts so that the circuit board can be positioned directly on the individual cells in order to achieve direct thermal contact.

In the electric battery according to the invention, the second insulated regions are each in thermally conductive contact with at least one cell connector of the battery.

An electric battery according to the invention preferably includes a plurality of rows of individual cells arranged next to one another. For example, the individual cells may be arranged in a matrix of N individual cells in M rows in the battery, where N and M are natural numbers greater than or equal to two.

A preferred battery includes a plurality of temperature measurement devices, one temperature measurement device being provided for every two rows of individual cells. In particular, each of the plurality of temperature sensors monitors the temperature of two to four individual cells.

A preferred electric battery has electronics for evaluating the measurement signals from the temperature sensors. For this purpose, the electronics may be connected to the multipole terminal of the at least one temperature measurement device via a multipole cable. The individual temperatures measured by the temperature sensors are preferably determined ratiometrically. This means that in particular the ratios of the measured signals to one another are determined, whereby, for example, a deviation from a desired value or an average value or the exceeding of a limit value can be determined.

BRIEF DESCRIPTION OF THE DRAWINGS

Further advantageous developments are described in more detail below with reference to an exemplary embodiment illustrated in the drawings, to which the invention is not restricted, however.

In the Figures.

DETAILED DESCRIPTION OF THE INVENTION BASED ON EXEMPLARY EMBODIMENTS

In the following description of a preferred embodiment of the present invention, the same reference symbols designate the same or comparable components.

Figure 1:
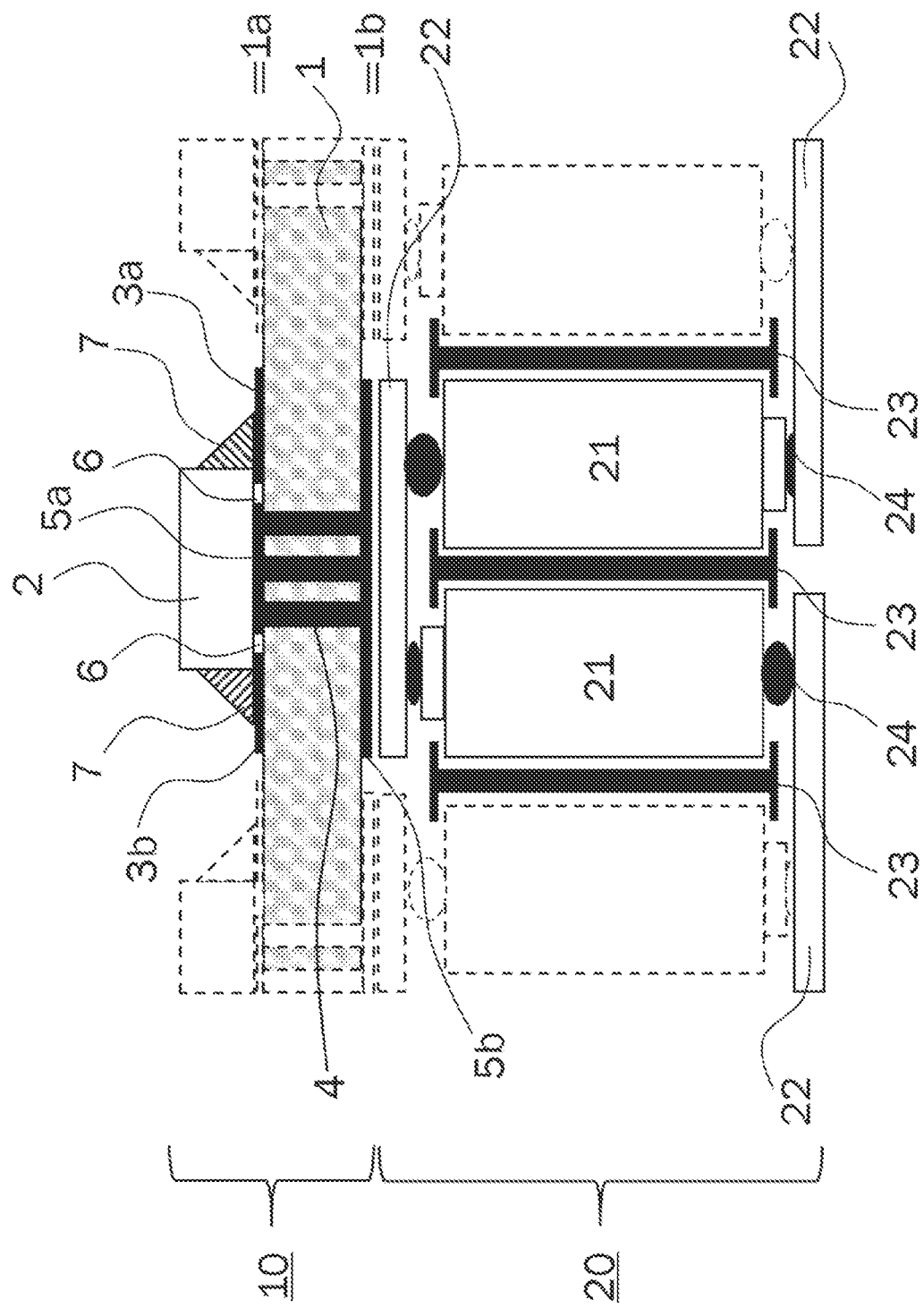
FIG. 1 shows a sectional view of an exemplary embodiment of a battery having a temperature measurement device according to the invention.

FIG. 1 shows a sectional view of an exemplary embodiment of a battery 20 having a temperature measurement device 10 according to the invention. The battery 20 includes a plurality of individual cells 21 arranged in a row. The individual cells 21 are connected in pairs to a cell connector 22 via soldering or welding points 24 and are connected in series. Cell holders 23 are arranged between the individual cells 21 and mechanically support the individual cells 21. A battery 20 according to the invention may have a plurality of rows of individual cells 21. In particular, a battery 20 may be constructed as a matrix of M rows, each with N individual cells 21, where M and N are natural numbers between ten and twenty, for example, in particular sixteen.

In FIG. 1, two individual cells 21 are shown in the middle, the left being arranged with the positive pole at the top and the right with the positive pole at the bottom. The two individual cells 21 are connected to the upper cell connector 22 by soldering or welding points 24 and are thus connected in series. Further individual cells 21 are shown in dashed lines to the right and left of the individual cells 21 shown in the middle in order to indicate that only a portion of a plurality of individual cells 21 is shown.

A temperature measurement device 10 is arranged on the battery 20. The temperature measurement device 10 includes a multi-layer circuit board 1 as a support element with an upper conductive layer 1a and a lower conductive layer 1b. The circuit board 1 is made of a heat-insulating material, for example plastic or fiber-reinforced plastic or commercial FR4 (class of hardly inflammable and flame-retardant composite materials consisting of epoxy resin and glass fiber fabric, "Flame Retardant 4") and has a thickness of one to several millimeters. The conductive layers 1a, 1b typically have a thickness of tens to hundreds of micrometers, for example 35 µm, and are made of a conductive material such as copper.

A plurality of temperature sensors 2 are arranged on the circuit board 1, each of which generates a temperature-dependent measurement signal. The temperature sensor 2 shown in the center of FIG. 1 is arranged on a first insulated region 5a of the upper conductive layer 1a. This insulated region 5a is separated from the rest of the upper conductive layer 1a by electrical insulation 6. The temperature sensor 2 is arranged directly on the first insulated region 5a so that the temperature sensor 2 measures the temperature of the first insulated region 5a.

A second insulated region 5b serving as a thermal contact surface is arranged below the first insulated region 5a on the lower side of the circuit board 1. The thermal contact surface lies directly on a cell connector 22 of the battery 20. The space in the drawing is only for better representation. A thermally conductive paste may be used for improved heat transfer between the cell connector 22 and the thermal contact surface.

The first insulated region 5a is thermally conductively connected to the underlying second insulated region 5b via three through-connections 4 so that the heat output by the individual cells 21 to the cell connector 22 is transmitted directly to the first insulated region 5a and 5a via the heat contact surface 5b and the through-connections 4 is thus transmitted to the temperature sensor 2. Thus, with the temperature sensor 2 arranged on the upper side of the circuit board 1, the temperature of the individual cells 21 located underneath can be measured very precisely.

Like the conductive layers 1a, 1b, the through-connections 4 may be made of copper. Depending on purity, copper has a relatively high thermal conductivity of approx. $_{240}$ to 400 W/(m K). Plastics, on the other hand, have a very low thermal conductivity of less than 1 W/(m K). Thus, heat can be conducted directly from the heat contact surface 5b (measurement point) to the temperature sensor 2 without heat losses in the circuit board 1. Furthermore, copper has a relatively low thermal capacity of approx. 0.382 kJ/(kg K) so that, at high thermal conductivity, there is a correspondingly high thermal diffusivity a. The thermal diffusivity a is calculated as the quotient of the thermal conductivity λ and the heat capacity c times the density ρ:

$$a = \frac{\lambda}{\rho \cdot c}$$

The thermal diffusivity a quantifies the temporal change in the spatial distribution of the temperature by thermal conduction as a result of a temperature gradient. This means that the temperature can be measured quickly and with little losses due to the high thermal diffusivity of the material between the temperature sensor 2 and the thermal contact surface 5b.

Of course, any other suitable material may also be used instead of copper.

As shown in FIG. 1, the temperature sensor 2 is attached to the circuit board 1 by soldering pads 7. The soldering pads 7 also create the electrical contact to the conductor tracks 3a and 3b which are connected to a multipole terminal 11 for reading the measurement signals (see FIG. 2).

In an embodiment not shown, the temperature sensors 2 may each be surrounded by a thermally conductive jacket that is thermally conductively connected to the respective first insulated region 5a. Such a thermally conductive jacket can improve the heat transfer from the first insulated region 5a to the temperature sensor 2. In particular, the heat is uniformly distributed over the entire periphery of the temperature sensor 2, thereby enabling more accurate temperature measurement.

FIG. 2a shows a top view of a temperature measurement device 10 according to the invention and FIG. 2b shows a corresponding bottom view. Only a central section of the temperature measurement device 10 is shown in each case so that four temperature sensors 2 are visible. The temperature measurement device 10 extends further to the left and right than is apparent in the illustration. The exemplary temperature measurement device 10 includes a total of eight temperature sensors 2.

Figure 2:
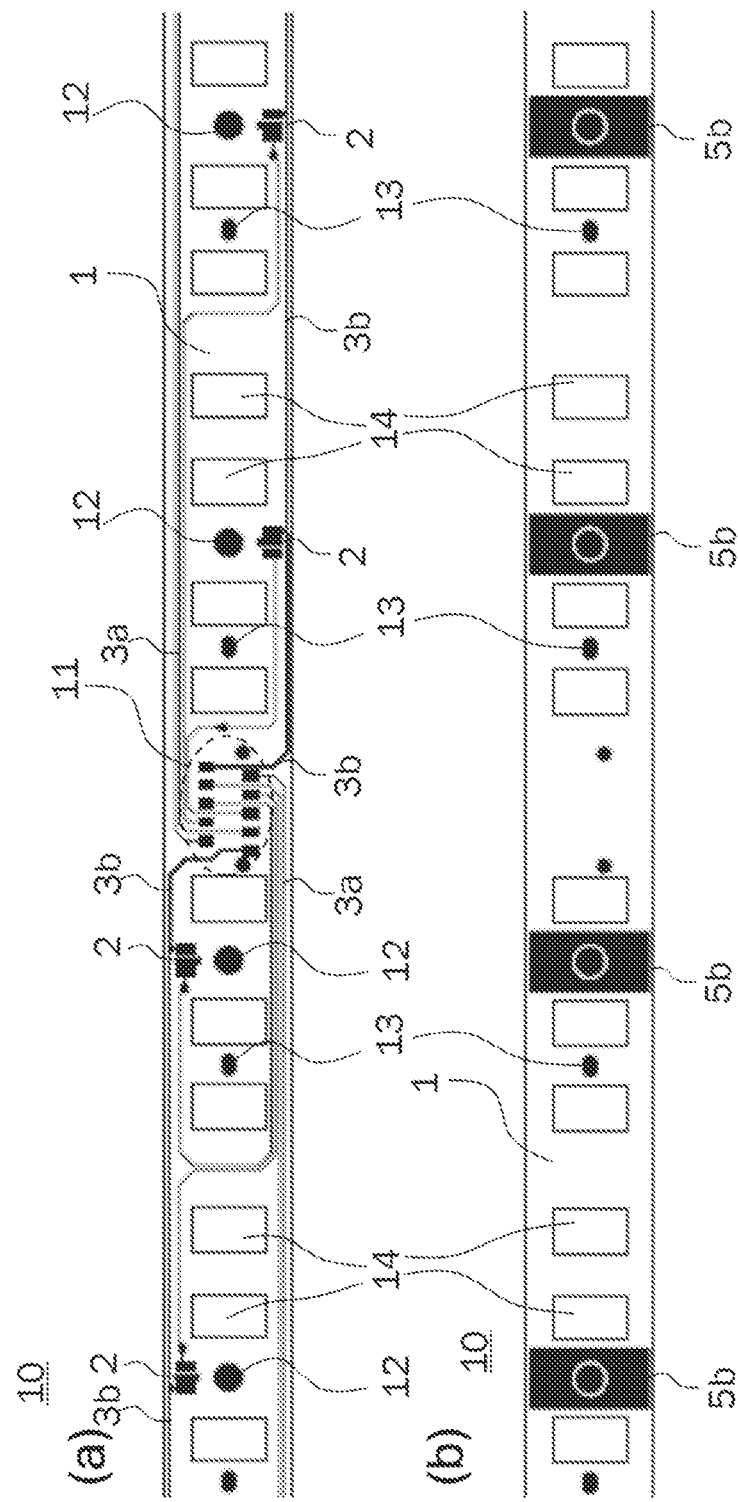
FIG. 2a shows a top view of a temperature measurement device according to the invention and FIG. 2b shows a corresponding bottom view.

As can be seen in FIG. 2, the temperature measurement device 10 includes a plurality of fastening means 12 for fastening the circuit board 1 to a battery (20). The fastening means 12 are configured, for example, as bores in the circuit board 1 which are located directly next to the temperature sensors 2 so that the temperature measurement device 10 can be screwed to the battery 20, wherein a firm and direct contact of the thermal contact surfaces 5b with the cell connectors 22 of the battery 20 can be ensured.

The multipole terminal 11 for reading the measurement signals is shown in the center in FIG. 2a. In the exemplary embodiment shown, there is a 10-pole terminal 11 with eight signal poles and two grounding poles. The signal poles are each connected to a first terminal of the temperature sensors 2 via separate first conductor tracks 3a in the upper conductive layer 1a. The grounding poles are each connected to a second terminal of the temperature sensors 2 via common second conductor tracks 3b.

The temperature measurement device 10 may be connected to electronics for evaluating the measuring signals of the temperature sensors 2 via the multipole terminal 11 and a corresponding multipole cable. According to an exemplary embodiment, the individual temperatures measured by the temperature sensors 2 are determined ratiometrically by electronics. This means in particular that the ratios of the measured signals to one another are determined, wherein, for example, a deviation from a desired value or an average value or the exceeding of a limit value can be determined.

The circuit board 1 also has a plurality of rectangular cutouts 14. The cutouts 14 reduce the total surface area and the total mass of the temperature measurement device 10. Thereby, the total thermal capacity of the temperature measurement device 10 is reduced, leading to improved measuring accuracy since the temperature measurement device 10 absorbs less heat from the battery 20 to be measured.

Furthermore, the cutouts 14 allow air to be supplied and thus allow the individual cells 21 to be cooled by air. In addition, the cutouts 14 are also used to secure the temperature measurement device 10 on the battery 20. In addition, the cutouts are arranged such that cell holders 23 of the individual cells can protrude through the cutouts 14 so that the circuit board 1 can be positioned directly on the cell connectors 22 of the individual cells 21 in order to achieve direct thermal contact. In addition, the circuit board 1 has locking bores 13 for fastening the temperature measurement device 10 to the battery 20.

Figure 3:
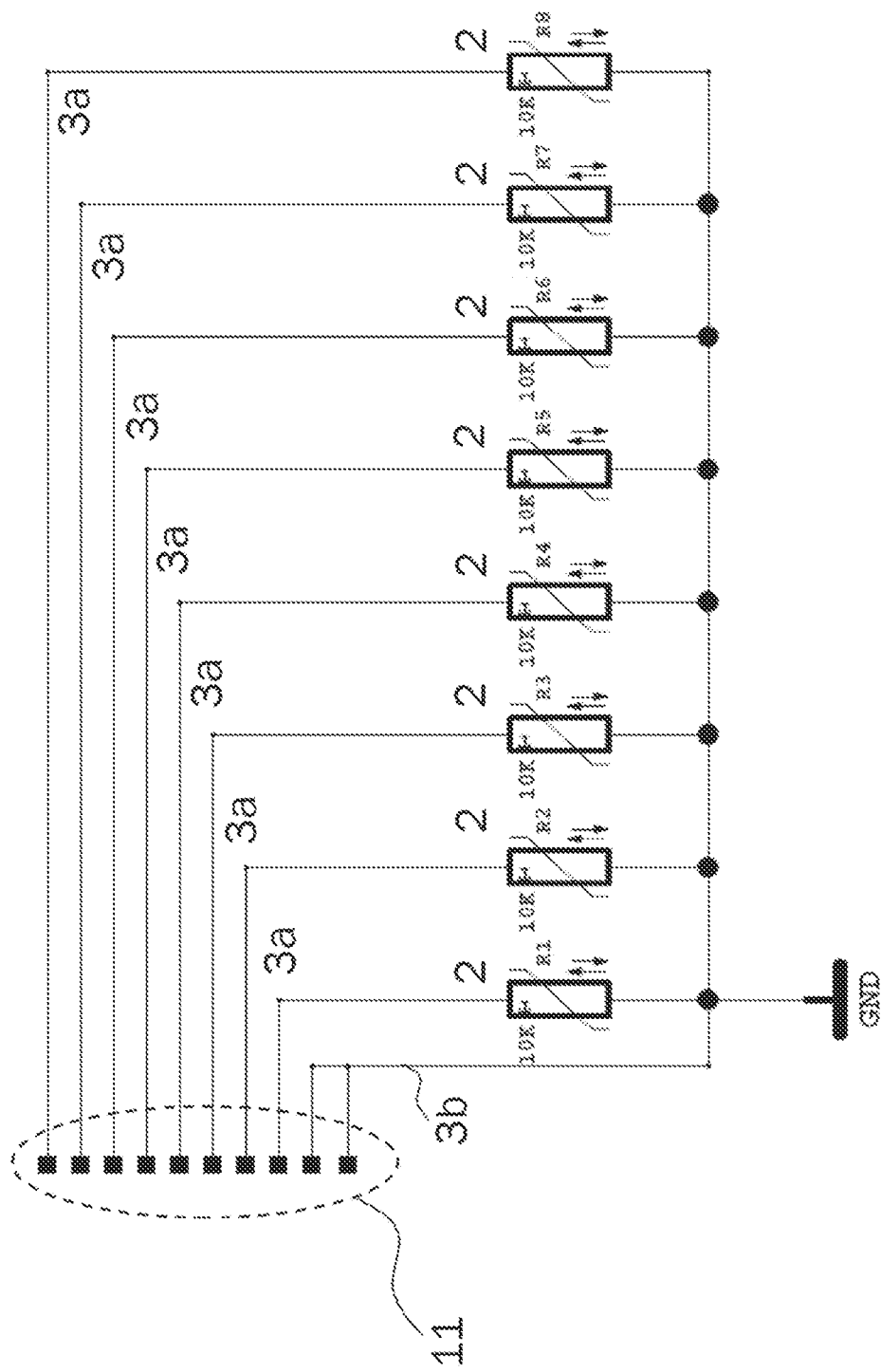
FIG. 3 shows an exemplary circuit diagram of a temperature measurement device according to the invention.

FIG. 3 shows an exemplary circuit diagram of the temperature measurement device 10. Eight signal lines 3a extend from the 10-pole terminal 11 to the eight temperature sensors 2. Two grounding lines 3b for grounding the temperature sensors 2 are also provided. The temperature sensors 2 are configured as NTC thermistors, the resistance of which may be determined as a measured temperature value.

Figure 4:
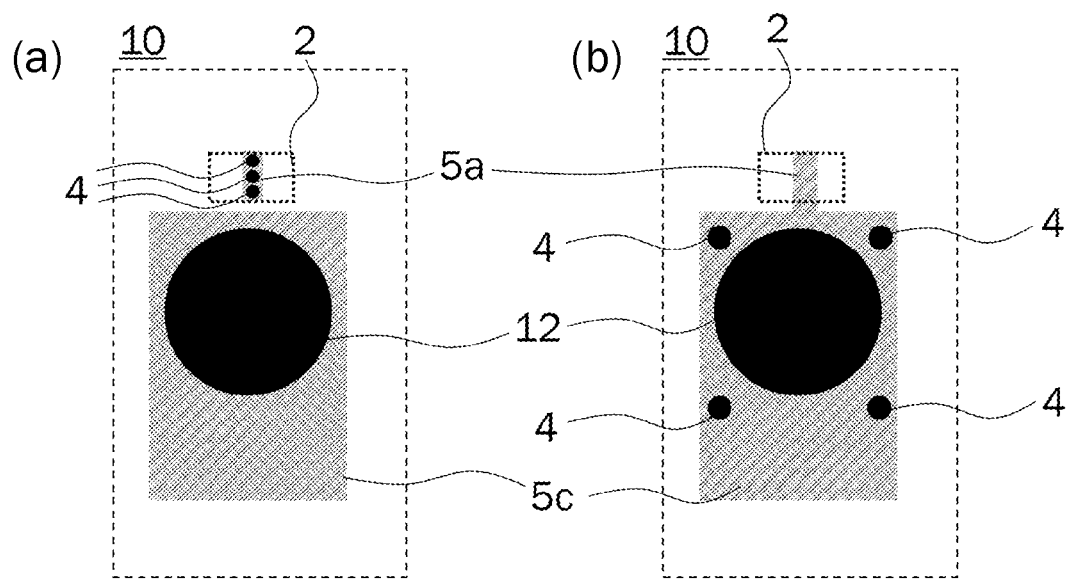
FIGS. 4a and 4b show two different exemplary embodiments of the temperature measurement device according to the invention.

FIGS. 4a and 4b each show a portion of the temperature measurement device 10 in a top view similar to FIG. 2a, with a portion around a temperature sensor 2 being shown in each case. Details shown in FIG. 2a, such as the conductor tracks 3a and 3b, have been omitted in FIG. 4 for the sake of clarity.

FIGS. 4a and 4b show two different exemplary embodiments with a different arrangement of the through-connections 4. In FIG. 4a, three through-connections 4 are arranged directly below the temperature sensor 2. This embodiment thus essentially corresponds to the example shown in FIG. 1. The through-connections 4 may be through-connections filled with copper, for example. However, the through-connections 4 may also be formed as holes in which only the walls are covered with a conductive layer, e.g. made of copper, wherein a though hole remains in each case, through which air can pass. The first insulated region 5a is shown in FIGS. 4a and 4b as a dashed region.

FIG. 4b shows an alternative exemplary embodiment, in which the through-connections 4 are not arranged below the temperature sensor 2 but next to it. In addition, a third insulated region 5c is arranged next to the temperature sensor 2, the surface of which substantially corresponds to the second insulated region 5b on the lower side of the temperature measurement device 10 (see FIG. 2b). The third insulated region 5c may be provided as a copper surface, for example. In this embodiment, the through-connections 4 may have a larger diameter. In FIG. 4b, four through-connections 4 are shown as an example. Because of the larger region available, more than four through-connections 4 may also be provided.

Similar to the example of FIG. 4a, the through-connections 4 of the alternative exemplary embodiment may be copper-filled through-connections or holes in which only the walls are covered with a conductive layer, e.g. made of copper, wherein a through-hole through which air can flow remains in each case. Due to the larger diameter compared to FIG. 4a, the through holes may be larger so that an improved air exchange is possible. In addition, improved thermal conductivity can be achieved through the plated-through holes 4. Furthermore, capillary effects can be reduced and thus a condensation in the through-holes can be avoided.

The third insulated region 5c is particularly good at absorbing heat from the second insulated region 5b and transferring it to the temperature sensor 2 via the connection to the first insulated region 5a. Thus, an improved heat transfer from the lower side of the temperature measurement device 10 to the upper side with the temperature sensors 2 can be achieved so that the measurement of the temperature can be improved.

Figure 5:
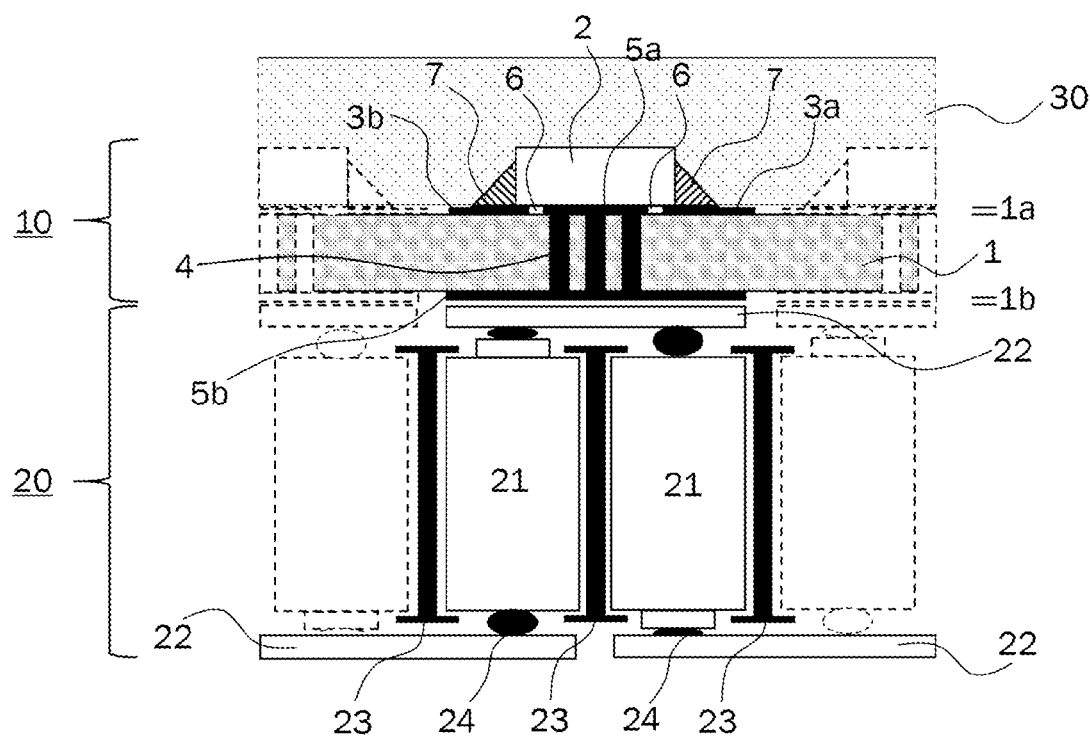
FIG. 5 shows a sectional view of a further exemplary embodiment of a battery having a temperature measurement device according to the invention with a compriband.

FIG. 5 shows a further exemplary embodiment of a battery 20 according to the invention, in which, in contrast to the exemplary embodiment in FIG. 1, a compriband 30 is arranged on the temperature measurement device 10. In particular, the compriband 30 may be glued to the circuit board 1 of the temperature measurement device 10.

The compriband 30 is electrically and thermally insulating and sealing. For example, it may be a pre-compressed, impregnated foam sealing tape, e.g. based on polyurethane. Alternatively, it may be a compression band made of rubber, for example. It can be mechanically deformed to conform to the surface of the temperature measurement device 10 and will expand by itself after compression. The compriband 30 may be pressed mechanically against the circuit board 1 of the temperature measurement device 10 by a housing lid of the battery 20 so that it rests firmly on the circuit board 1 even without adhesive.

The compriband 30 may advantageously cover the temperature measurement device 10 in an airtight manner so that a harmful formation of condensation water on the temperature measurement device 10 can be prevented. In addition, the compriband 10 serves as thermal insulation from the ambient air, which means that the accuracy of the temperature measurement can be improved since the temperature of the circuit board 1 is no longer (or at least to a small extent) influenced by the ambient air.

The features disclosed in the above description, the claims and the drawings may be significant for the implementation of the invention in its various embodiments both individually and in any combination.

The invention claimed is:

1. An electric battery (20), comprising:
a plurality of individual cells (21),
at least one cell connector (22) connected to the individual cells (21),
at least one temperature measurement device (10) that includes
a multilayer circuit board (1) as a carrier element having an upper conductive layer (1a) with first electrically insulated regions (5a) and a lower conductive layer (1b) with second electrically insulated regions (5b); and
a plurality of temperature sensors (2) that are each configured to generate a temperature-dependent measurement signal and that are each arranged on a respective first electrically insulated region (5a) of the upper conductive layer (1a), wherein a respective second electrically insulated region (5b) of the lower conductive layer (1b) is a thermal contact surface for each temperature sensor (2); and
a multipole terminal (11) for reading the measurement signals, wherein:
each first electrically insulated region (5a) is thermally conductively connected to a corresponding second electrically insulated region (5b) via at least one through-connection (4) that passes through the circuit board, and
the second electrically insulated regions (5b) are each in thermally conductive contact with the at least one cell connector (22) that is connected to the individual cells (21).

2. The electric battery (20) according to claim 1, wherein said multipole terminal (11) comprises:
a plurality of signal poles each electrically connected to one of said plurality of temperature sensors (10) via separate conductor tracks (3a) in said upper conductive layer (1a); and
at least one grounding pole electrically connected to each of said plurality of temperature sensors (10) via at least one conductor track (3b).

3. The electric battery (20) according to claim 1, wherein each first electrically insulated region (5a) is thermally conductively connected to a respective second electrically insulated region (5b) via a plurality of through-connections (4).

4. The electric battery (20) according to claim 1, wherein:
said circuit board (1) is made of a heat-insulating material; and/or
said temperature measurement device (10) also includes a plurality of fastening means (12) for fastening said circuit board (1) on said battery (20).

5. The electric battery (20) according to claim 1, wherein said temperature sensors (2) are each surrounded by a thermally conductive jacket which is thermally conductively connected to the respective first electrically insulated region (5a).

6. The electric battery (20) according to claim 1, wherein said circuit board (1) has a plurality of cutouts (14).

7. The electric battery (20) according to claim 1, wherein:
said battery (20) includes a plurality of rows of individual cells (21) arranged next to one another; and
each of said plurality of temperature sensors (2) is provided for measuring the temperature of a plurality of individual cells (21) from adjacent rows.

8. The electric battery (20) according to claim 1, wherein the individual temperatures measured by said temperature sensors (2) are determined ratiometrically.

9. The electric battery (20) according to claim 1, wherein a compriband (30) is arranged on an upper side of said temperature measurement device (10).

10. The electric battery (20) according to claim 1, wherein a plurality of through-connections (4) are arranged between a third electrically insulated region (5c) on said upper conductive layer (1a) and said second electrically insulated region (5b), wherein, in each case, said third electrically insulated region (5c) is arranged next to a temperature sensor (2) in an offset manner.

* * * * *